May 8, 1928.

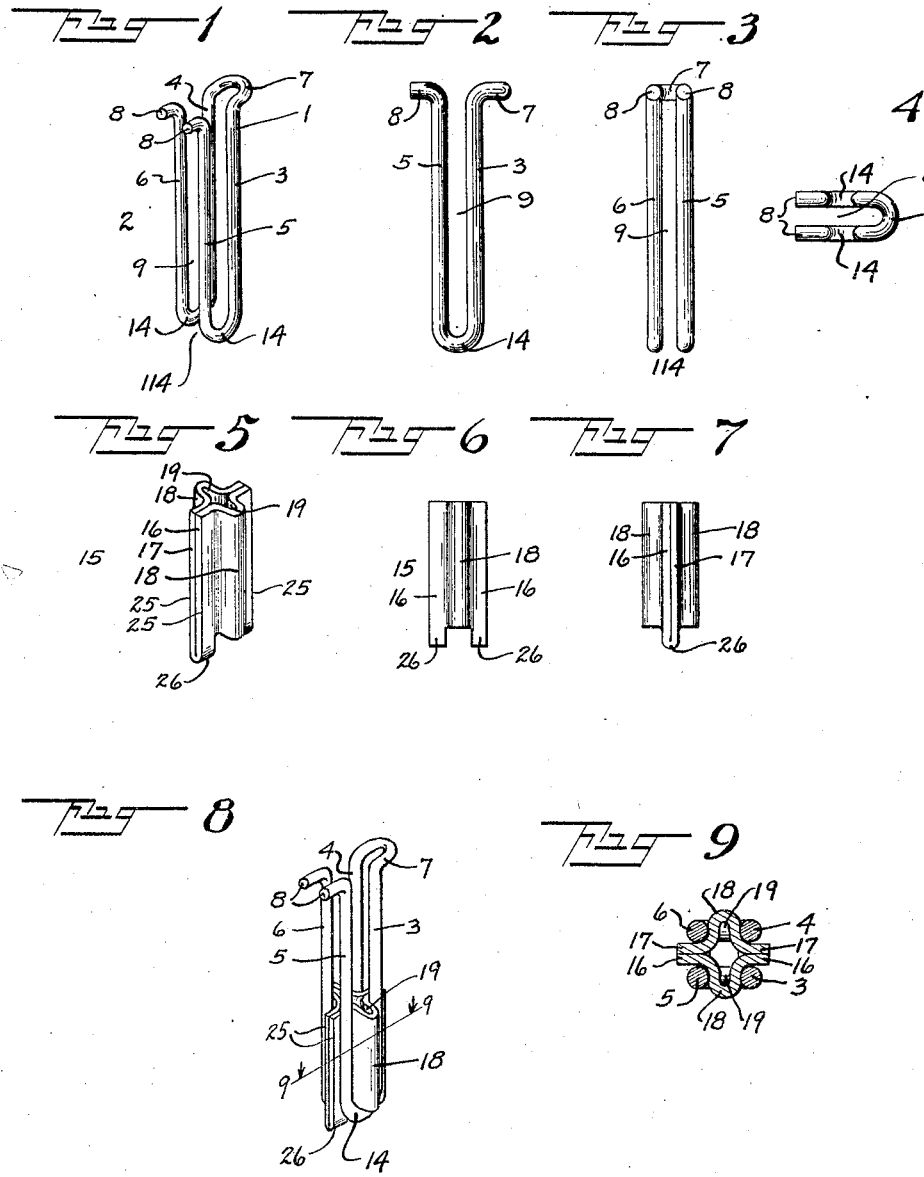

J. KARITZKY

NAIL EXPANSION

Filed Aug. 20, 1926

John Karitzky
INVENTOR.

BY Alan M Johnson
ATTORNEYS.

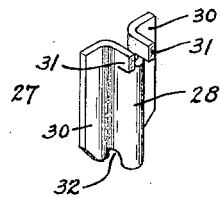
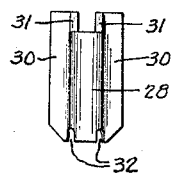
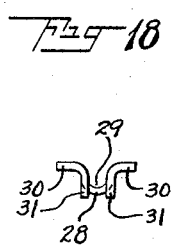
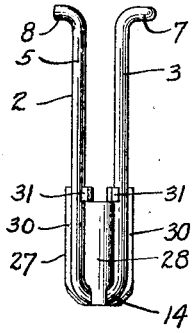
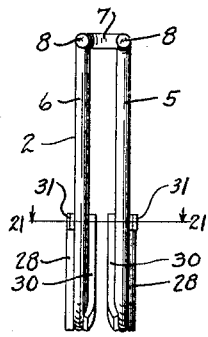
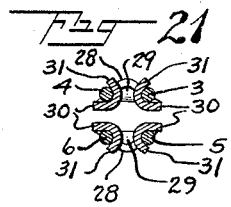
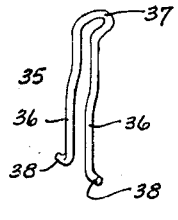
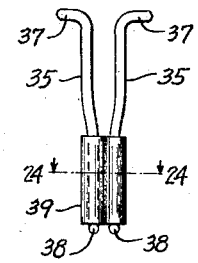
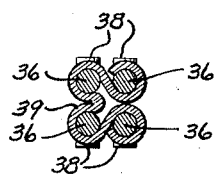
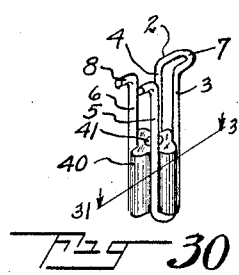
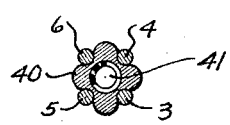

May 8, 1928.
J. KARITZKY
1,668,594
NAIL EXPANSION
Filed Aug. 20. 1926
4 Sheets-Sheet 4
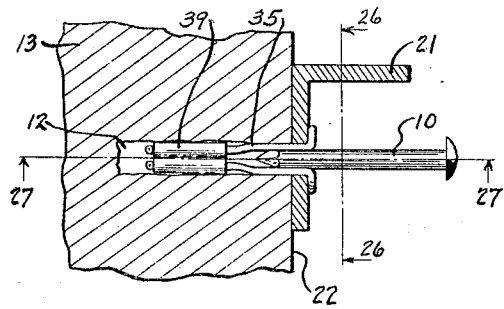
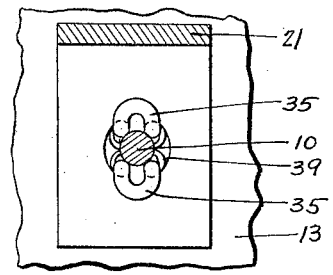
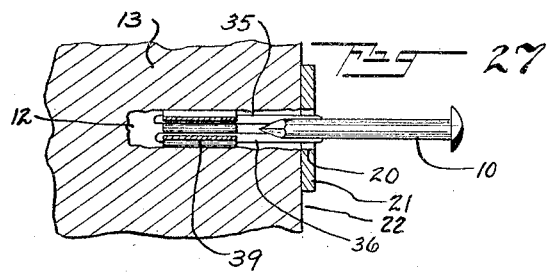
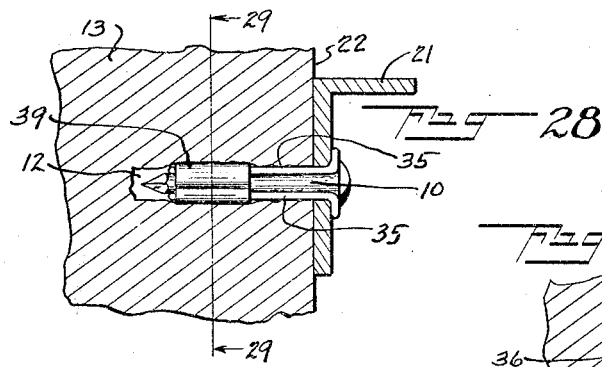
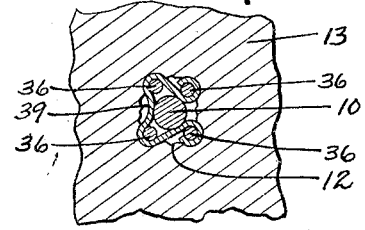
John Karitzky
INVENTOR.
BY Alexander Johnson
ATTORNEYS.

Patented May 8, 1928.

1,668,594

UNITED STATES PATENT OFFICE.

JOHN KARITZKY, OF GARWOOD, NEW JERSEY, ASSIGNOR, BY MESNE ASSIGNMENTS, TO HENRY B. NEWHALL CORPORATION, OF GARWOOD, NEW JERSEY, A CORPORATION OF NEW JERSEY.

NAIL EXPANSION.

Application filed August 20, 1926. Serial No. 130,387.

My invention relates to expansion bolts and more particularly to a nail expansion shield formed of wire, or similar material, the wire being either round, flat, or any other form, and an insert of any suitable material.

My invention relates to such a wire shield having a metal insert which serves to reduce the area of the axial bore, and to fill up, more or less, the intervals or spaces between the strands of the wire shield, to more readily guide the expanding member, and increase the bond or grip of the shield with a support.

My invention further relates to certain articles of manufacture and combinations which will be more fully hereinafter described and pointed out in the claims.

In the accompanying drawings the same reference numerals refer to similar parts in the several figures.

Fig. 1 is a perspective view of one form of wire shield which I may employ;

Fig. 2 is a side elevation of the shield shown in Fig. 1;

Fig. 3 is a front elevation of the wire shield;

Fig. 4 is a plan view of the wire shield shown in Fig. 1;

Fig. 5 is a perspective view of a member which I mount within the wire shield which, for purposes of description, is herein referred to as an insert;

Fig. 6 is a face view of the insert shown in Fig. 5;

Fig. 7 is a side elevation of the insert;

Fig. 8 is a perspective view of the complete wire shield and insert;

Fig. 9 is a horizontal section, taken on the line 9—9 of Fig. 8, looking down in the direction of the arrows;

Figure 10:
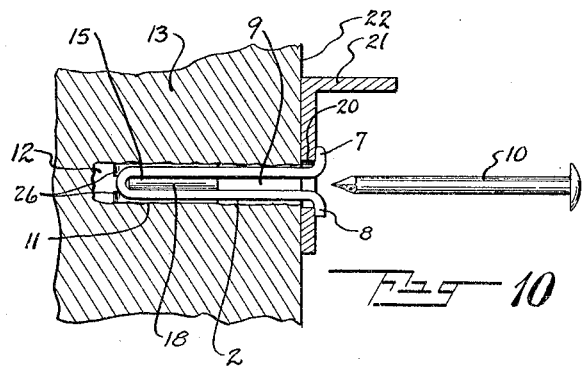
Fig. 10 is a vertical section through a support showing my improved expansion shield in position ready to be expanded by a nail.

Figs. 15 at 21 illustrate a modification. Fig. 15 is a perspective view of a different form of insert;

Fig. 16 is a face view of the insert shown in Fig. 15;

Fig. 17 is a side elevation of the insert shown in Fig. 16;

Fig. 18 is a plan view of the insert shown in Fig. 15;

Fig. 19 is a side elevation of my wire expansion shield equipped with two of the inserts shown in Fig. 15;

Fig. 20 is a front elevation of the expansion shield shown in Fig. 19;

Fig. 21 is a horizontal section on the line 21—21 of Fig. 20;

Figs. 22 to 30 show a different modification. Fig. 22 is a perspective view of a wire unit, a plurality of which are used to make a wire shield;

Fig. 23 is a side elevation of one form of wire shield formed of two of the units shown in Fig. 22, the units being held together by the insert;

Fig. 24 is a horizontal section on the line 24—24 of Fig. 23;

Fig. 25 is a vertical section through a support showing a nail being inserted into the shield;

Fig. 26 is a vertical section on the line 26—26 of Fig. 25 looking in the direction of the arrows;

Fig. 27 is a horizontal section on the line 27—27 of Fig. 25;

Fig. 28 is a vertical section, similar to Fig. 25, showing the nail driven home in the shield;

Fig. 29 is a vertical section on the line 29—29 of Fig. 28;

Figs. 30 and 31 show a still further modification. Fig. 30 is a perspective view of a wire shield and an insert of ductile metal, as for example lead or an alloy;

Fig. 31 is a horizontal section on the line 31—31 of Fig. 30.

In my invention a cheap grade of commercial soft wire 1, of any suitable contour, is cut to the particular length desired to form an integral wire shield 2 having strands 3, 4, 5 and 6. A portion of the wire is bent at an angle to the strands 3 and 4 to form the head portion 7; the ends of the wire strands 5 and 6 are bent at substantially right angles to form the head portions 8, 8. These strands 3, 4, 5 and 6 extend longitudinally and around the axial bore 9 of the shield 2. The strands are separated from each other, more or less, dependent upon how the wire is bent.

By my present invention, I form my expansion shield out of wire and an insert which is so mounted, with relation to the wire, as to fill up, more or less, the gaps or intervals between the strands 3, 4, 5 and 6, to more readily guide the nail, or other expanding member 10, which may be employed to expand the shield. This insert, of whatever material it is formed, acts also as a filler to reduce the area of the axial bore 9 so that as the nail 10 is driven home a very powerful expansion is obtained, the strands 3, 4, 5 and 6 being forced radially and grip the walls 11 of the hole 12 in a support 13, of brick, masonry, concrete, stone or any other suitable material.

My insert is preferably mounted near the inner end 114 of the wire shield and extends forward but, preferably, not to the head portions 7 and 8, 8, for reasons to be more fully hereinafter pointed out.

Various forms of inserts may be employed. In Figs. 5 to 14 I have shown an insert 15 (Fig. 5) stamped from sheet metal and bent back upon itself having the wings 16 and 17 and an exterior rib 18, the interior of the rib forming complementary grooves 19, 19 to coincide with the axial bore of the wire shield and guide and direct the nail 10. This insert is slipped or pressed into the wire shield 2 so that one rib 18 will lie between the strands 3 and 5 and the other rib 18 will lie between the strands 4 and 6. The wings 16 and 17 of the insert will lie between the ribs 5 and 6 and between the ribs 3 and 4 as shown in Fig. 8.

Figure 11:
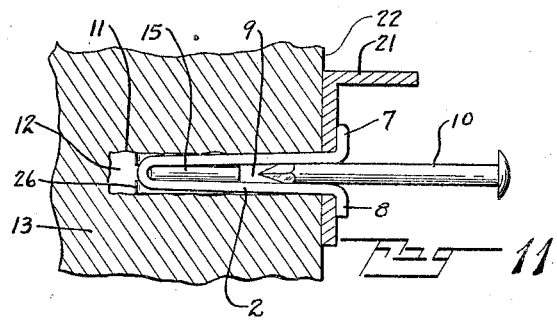
Fig. 11 is a vertical section, similar to Fig. 10, showing the nail partially driven into the shield.
Figure 12:
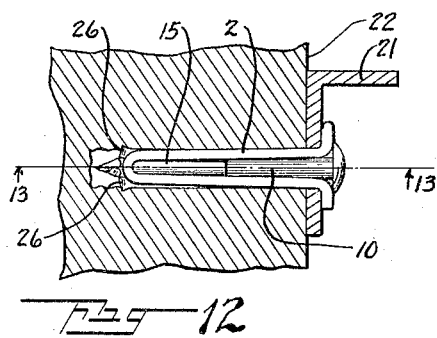
Fig. 12 is a vertical section, similar to Figs. 10 and 11, showing the nail completely driven into the shield.
Figure 13:
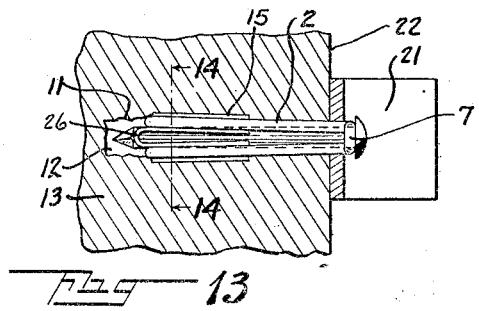
Fig. 13 is a horizontal section on the line 13—13 of Fig. 12.
Figure 14:
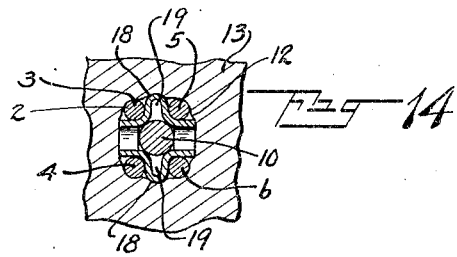
Fig. 14 is a vertical section on the line 14—14 of Fig. 13.

In this form of my invention, a hole 12 of minimum diameter for the particular size shield, is drilled or otherwise formed in the support 13. The expansion shield is then passed through a hole 20 in the bracket or other suitable support 21 to be secured to the face 22 of the support. The wire shield is pressed back into the hole until the head portions 7 and 8, 8 engage with the bracket 21. The nail 10 is then driven into the wire shield 2 following along the axial bore 9 between the strands 3, 4, 5 and 6 expanding these strands radially as shown in Fig. 11. At a point which may vary, but which will be before the nail reaches the end 114 of the wire shield 2, it engages the complementary grooves 19, 19 in the insert, and expands the insert and also the lower end of the wire shield; the insert not only acts as a guide for the end of the wire nail, but also as a filling or reducing member, reducing the area of the axial bore 9 of the shield and causing the maximum expansion to occur near the end of the shield removed from the face 22. By having the maximum expansion well back in the hole 12, the liability of cracking or breaking the surface 22 of the support, adjacent to the hole 12, is obviated or reduced to a minimum.

It will be noted that by employing this insert the points of contact with the interior surface 11 of the hole 12 are multiplied. Instead of merely the four strands of wire being wedged and pressed into contact with the surface of the hole, there are in addition the ribs 18, 18 and the edges 25, 25 of the insert; so that instead of four points contact, at the inner end of the hole, there are at least eight, counting two edges 25 as one point of contact.

In this particular structure, which is my preferred form, there is another and additional expansion. As the nail passes through the insert 15, it causes a secondary expansion of the portions 26, 26 of the insert at an angle to the primary expansion (see Fig. 12).

In Figs. 15 to 21, I have shown a different form of insert to be used with the same form of wire shield 2. This insert 27 (Fig. 15) is formed of a plurality of parts, preferably two. Each part is formed from sheet metal bent to form a rib 28 on the exterior and a groove 29 on the interior. The insert is provided with the wings 30, 30 and preferably, though not necessarily, with the ears 31, 31. This insert is secured in a wire shield 2 in any suitable manner, as for example, by permitting the loops 14, 14 between two of the strands 3, 4 and 5, 6 to be seated in the notches 32, 32. The ears 31, 31 can then be bent over and peened, if desired, to more firmly secure the insert to the strands of the wire shield, as shown in Fig. 21.

In this form of my invention two of these members 27 make a complete insert, serving to guide the end of the nail 10 through the complementary grooves 29, 29. The ribs 28, 28 and the wings 30, 30 serve to give additional bearing surfaces upon the interior of the hole, thereby greatly increasing the bond or grip of the shield with the support 13.

In Figs. 22 to 29 I have shown a different form of wire shield and insert. In this form of my invention, the wire shield is formed of a plurality of wire units 35 (Fig. 22), two such units being preferably employed. These units are formed by bending a piece of wire upon itself to form the strands 36, 36 and the bent head portion 37. The ends of the wire are bent out at 38, 38 to cooperate with the metal insert 39. In this form of my invention the metal insert 39 not only serves as a guide to the nail and reduces the area of the axial bore so as to increase the expansion at the end of the shield, but it also serves to secure the different wire units 35 together. This is done in any suitable manner as for example by forming the insert out of a strip of metal, or other suitable material, and wrapping it around the strands 36, 36 of the wire units as shown more clearly in Fig. 24. It will be clear from this figure that the insert serves to close the gaps between the strands 36, 36 and forms a guide for the nail so that the nail can not be driven at an angle to the longitudinal axis of the shield.

This shield is used in the same manner as those previously described being mounted in a hole 12 in a support 13 and supports any suitable work, such as a bracket 21. As the nail 10 is driven into the shield, the different units 35, 35 will be forced apart, which action will be resisted by the insert 39, which will become distorted and possibly broken as the nail is driven home, as shown in Fig. 29.

I have shown another modification of my invention in Figs. 30 and 31 in which a wire shield 2 is employed, such as shown in Fig. 1, having strands 3, 4, 5 and 6. Mounted within this shield is an insert preferably of cast distortable material, as for example lead or an alloy 40, though, of course, it is to be understood that the insert may be formed of any suitable material. Preferably, the axial bore 41 of this insert 40 is tapered as shown in Fig. 31. It is clear that the insert will be held within the wire shield by the resiliency of the different strands of wire shield. Edges of the insert may be peened, if desired, to more firmly secure it to the wire strands. As the nail 10 is driven home it will be guided by the tapered axial bore 41 and will expand and distort the insert 40, making a firm bond with the walls of the hole 12.

While throughout this specification I have referred to sheet metal insert, or a cast metal insert, it is, of course, to be understood that my invention is not to be confined to inserts formed of these materials, as any suitable material may be employed. While I have shown a smooth nail, it is to be understood that the nail may be provided with a roughened surface, and that a threaded bolt provided with square or countersunk head may be employed instead of a nail.

It will be noted that my expansion shield may be made at minimum cost, that it is simple and will give the maximum efficiency for a given size shield. It is further to be noted that the different wire shields, or wire units, are each open constructions, which will freely allow galvanizing by the hot process. The inserts are preferably inserted after the wire units have been galvanized.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising a wire expansion shield having a plurality of longitudinally extending strands of wire and head portions and an insert mounted within the shield adapted to guide an expanding member and fill up, more or less, the area of the axial bore formed by the strands of wire.

2. A new article of manufacture comprising a wire expansion shield having a plurality of longitudinally extending strands of wire, and an insert mounted within the shield and adapted to have a primary and secondary expansion.

3. A new article of manufacture comprising an integral wire expansion shield formed from a single strand of wire bent back on itself to form a plurality of longitudinally extending strands of wire, and a resilient insert mounted within the integral wire shield and adapted to have a primary and secondary expansion.

4. A new article of manufacture comprising an integral wire expansion shield formed from a single strand of wire bent back on itself to form a plurality of longitudinally extending strands of wire and head portions, and an insert mounted within the integral wire shield adapted to guide an expanding member and fill up, more or less, the area of the axial bore formed by the strands of wire.

JOHN KARITZKY.